(No Model.) 2 Sheets—Sheet 1.
J. H. ELWARD.
PLANTER.
No. 545,584. Patented Sept. 3, 1895.
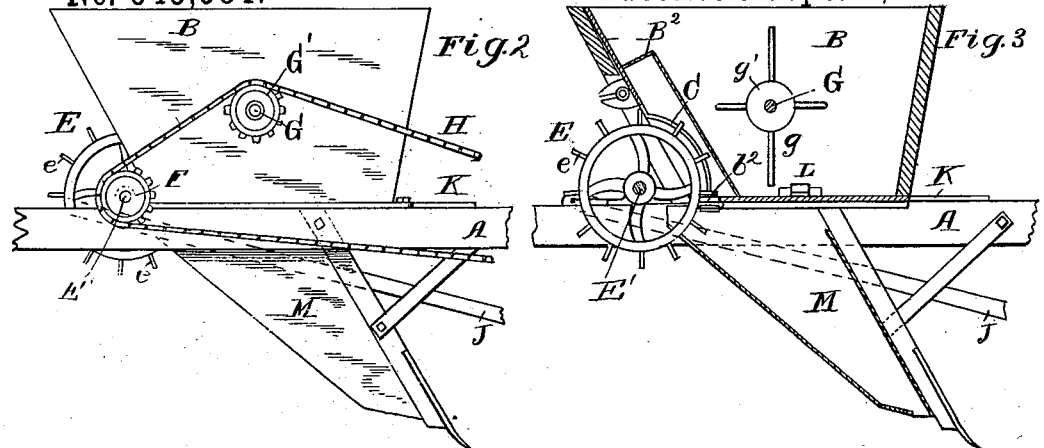
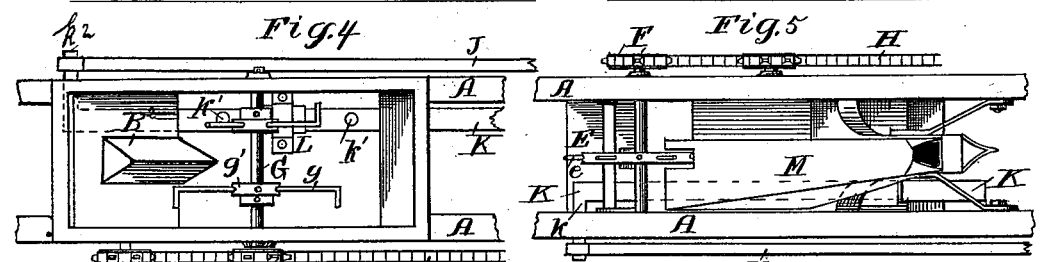
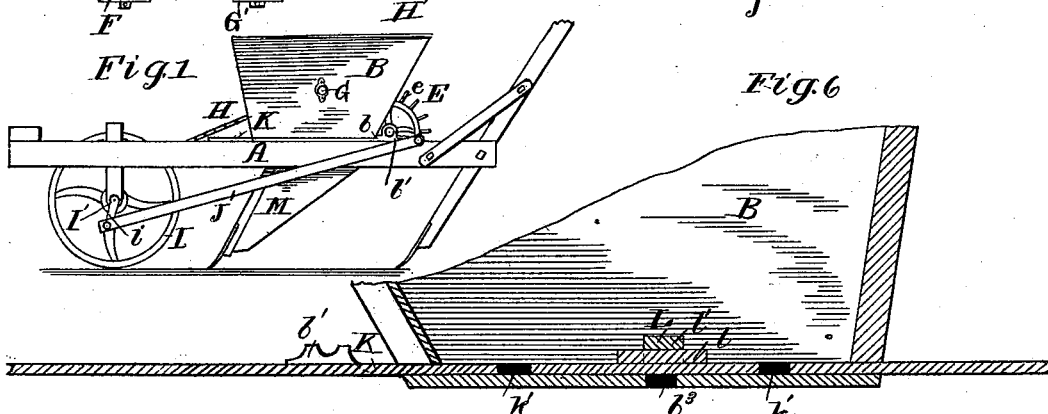
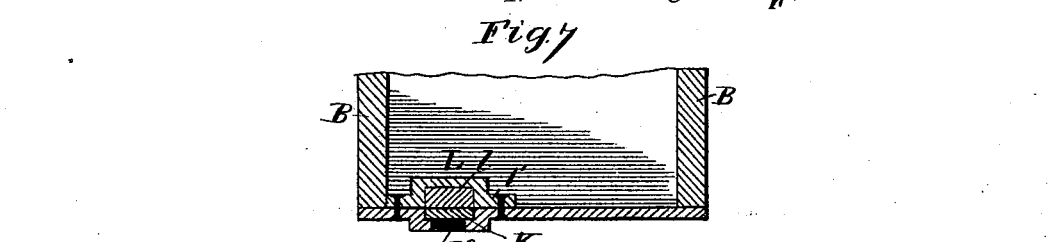
Witnesses
J. C. Turner
B. W. Sommers
Inventor
John H. Elward
by Doubleday & Bliss
Attorneys (No Model.) 2 Sheets—Sheet 2.
J. H. ELWARD.
PLANTER.
No. 545,584. Patented Sept. 3, 1895.
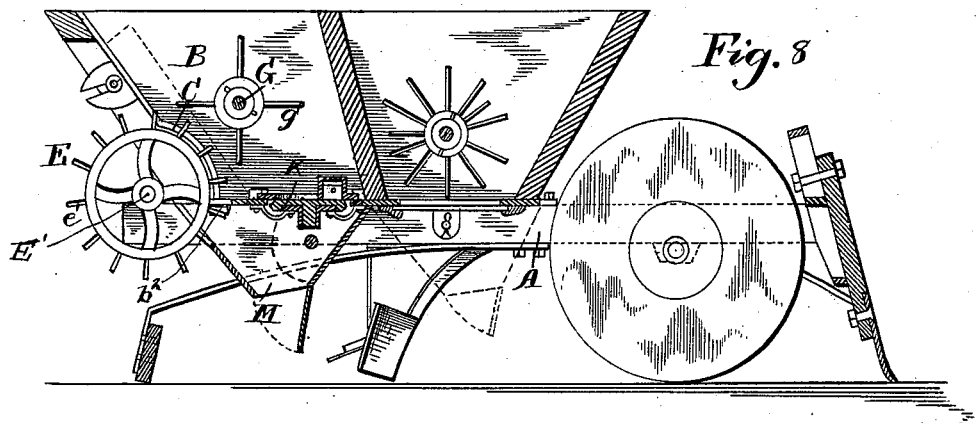
Fig. 8
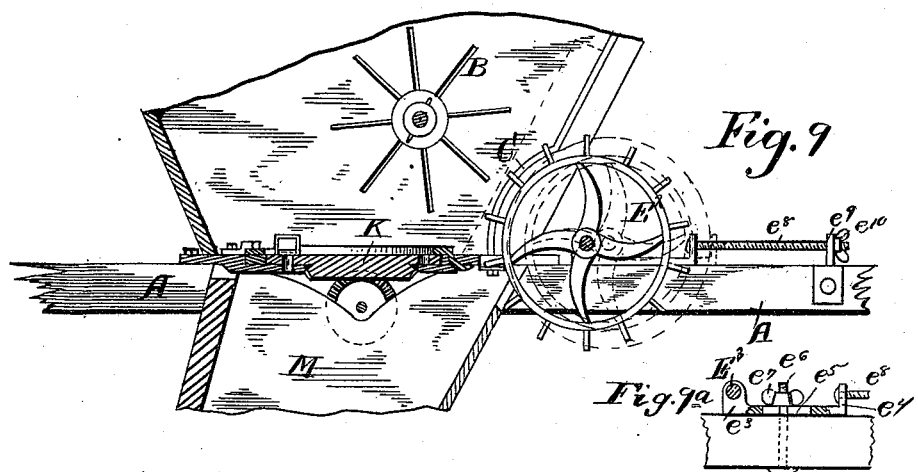
Fig. 9
Fig. 9ª
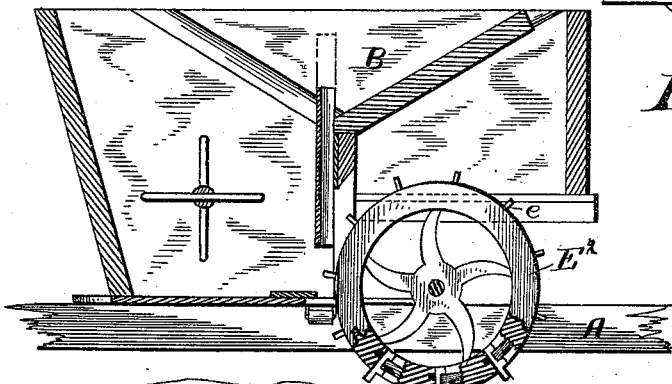
Fig. 10
Fig. 11
Witnesses:
J. B. McGiver
B. W. Sommers
Inventor
John H. Elward
by Doubleday & Bliss
attys

UNITED STATES PATENT OFFICE.

JOHN H. ELWARD, OF WHITEWATER, WISCONSIN.

PLANTER.

SPECIFICATION forming part of Letters Patent No. 545,584, dated September 3, 1895

Application filed December 22, 1887. Serial No. 258,738. (No model.)

*To all whom it may concern:*

Be it known that I, JOHN H. ELWARD, a citizen of the United States, residing at Whitewater, in the county of Walworth and State of Wisconsin, have invented certain new and useful Improvements in Planters, of which the following is a specification, reference being had therein to the accompanying drawings.

This invention relates to improvements in planting-machines, it pertaining more especially to machines of the class of those adapted to plant from one and the same hopper seeds of two or more sorts. It is well known that it is desirable to provide the farmer with a small machine, having but few parts, of a simple and durable character, with which he can plant, first, seeds of one sort and then, without removing any of the parts attached to the seed-receptacle, readily deliver therefrom seed of another sort, after making a slight change of the power mechanism.

This invention has for its object to provide the farmer with such an implement.

I have in other applications which I have filed shown several forms of mechanism which illustrate, broadly, the features of construction and operation above referred to; and I also illustrate herein some of the same, although this case pertains more particularly to the desirable features of construction incident to one or more of them.

Figure 1 is a side elevation of a planter embodying my improvements. Fig. 2 is an enlarged view from the opposite side. Fig. 3 is a longitudinal section. Fig. 4 is a top plan view. Fig. 5 is a bottom view. Fig. 6 is a longitudinal section, on a still larger scale, of some of the parts. Fig. 7 is a cross-section of Fig. 6. Fig. 7$^a$ shows the hopper-bottom. Fig. 8 is a longitudinal section of a modified form of the machine. Figs. 9, 9$^a$, 10, and 11 show other modifications.

The machine has a main frame formed with longitudinal side bars A and such cross-connecting parts as may be necessary. To these the hopper or seed-receptacle B is secured, it being adapted to receive and carry seeds of one sort or another. The bottom is formed of an iron plate, having backwardly-extending arms $b\,b$, adapted to lie above and rest upon the sills A A, and they provide supports for the bearings of the shaft of one of the seed-feeding wheels. These arms $b\,b$ may be either formed integral with the bottom plate of the hopper or made separately therefrom. This hopper is formed with two seed-exit passages—one for cotton-seed at $b^2$ and the other for corn or similar seed at $b^3$—and with the hopper are combined two sets of devices for positively delivering therefrom the seeds which it may contain.

The cotton-feeding mechanism consists, mainly, of a wheel mounted on the shaft E′, the latter being carried in bearings $b′$, supported on the aforesaid backward-projecting arms $b$. This wheel is provided with a series of fingers $e\,e$, which project from its periphery, which are adapted to positively force the cotton-seed in successive charges downward through the bottom of the hopper, the exit from the latter being that at $b^2$, as aforesaid. The fingers $e\,e$ enter the hopper through the back wall, there being a slot or passage at C. Preferably the rear wall is made separate from the rest of the hopper and is adapted to be adjusted forward and back relatively to wheel E and the exit $b^2$, so that the amount of seed delivered can be readily regulated. Instead of this the wheel E may be mounted adjustably in sliding bearings, as will be more fully described below, or the fingers may be adjustably secured to the wheel, so that they can be projected more or less from the periphery. On the shaft E′ there is a sprocket-wheel F, which is connected with the shaft of the ground-wheel I by a chain H. In order to advance the seed through the hopper toward the delivering-fingers $e\,e$, I employ agitators $g\,g$, secured to the shaft G, mounted across the chamber. The agitator-arms $g\,g$ are fastened to hubs $g′$, and in order to prevent them from interfering with the feeding devices I arrange one hub on one side of the wheel and another on the other side.

As it is intended to carry in the hopper seeds other than cotton and plant the same therefrom, I provide a cover for that part of the wheel E which lies inside of the hopper, and also adapted to lie over and to cover the apertures in the rear wall and in the bottom, through which the wheel and its parts pass. When these are thus covered, the machine can be used for the planting of other seeds, such as corn.

In Figs. 3 and 4 I have shown a form of corn-feeding devices which, although it is admittedly old, broadly considered, I find to be in some respects particularly advantageous when used in a machine of this character—that is to say, one capable of planting either cotton or corn from one and the same hopper. K represents a sliding feed or seed bar mounted in the bottom of the hopper, the latter being cast with a depression to form a guide or way in which this bar is fitted. At its rear end it is pivotally connected to a pitman J by lateral extension $k$. The pitman J lies outside of the main frame and extends forward to the shaft I' of the ground-wheel, the latter having a crank $i$ for driving the pitman. The bar K is long enough at all times to project entirely through the hopper, the front wall and the rear of the latter acting to hold it in place. In this bar there are apertures $k'$ $k'$, adapted to receive the discharges of corn. As the bar reciprocates these charges are carried under the cut-off. (Indicated by L. It consists of a block of rubber $l'$, resting upon the sliding bar and secured to and held in place by a strap of metal $l'$. Directly below this rubber there is an aperture in the bottom plate, with which the apertures $k'$ alternately register. When the pitman is moved, the bar K is moved back and forth, and at each reciprocation two charges of seed are dropped. It will be seen that the corn-passages and the devices for delivering the seed through them are both entirely independent of those used in planting cotton. It will also be noticed that the corn-planting mechanism is exceedingly simple and of such nature that its parts can be compactly arranged without in any manner interfering with those used in the planting of cotton. The pins which fasten the pitman to the crank $i$ and to arm $k^2$ can be readily removed to permit the pitman to be detached when necessary to throw the corn-feeding devices out of operation and drive the cotton-feeder. The chain H can as readily be detached from the cotton mechanism when it is to be idle.

In Figs. 8, 9, 9$^a$, 10, and 11 I have shown modified forms of the machine. For a fuller understanding of the details of these machines when seen in top or bottom plan in cross-section or detached from the machine reference may be made to my other application, Serial No. 262,165.

In Fig. 8 the corn-delivering device is a revolving beveled wheel instead of a sliding bar, said wheel being supported at the center. In Fig. 10 a construction is shown in which a single wheel is adapted to feed both cotton and corn, and in Fig. 11 a mechanism more or less similar is also used.

In Fig. 9 a revolving beveled wheel is employed, it having no center support, but being held at the edges. In this construction a cotton-seed-feeding wheel is employed which is mounted in sliding bearings. These bearings are carried by bars $e^3$, which terminate in lugs or plates $e^4$. The bars $e^3$ are slotted at $e^5$, and through the slots pass bolts $e^6$ with set-screws $e^7$. With each bearing engages a threaded rod $e^8$, which passes through a plate $e^9$, and with this plate a thumb-nut $e^{10}$ engages. There is one set of these last-described devices on each side of the machine, and it will be seen that by means of them the bearings of wheel E$^2$ and the wheel itself can be moved to and fro to adjust it relatively to the cotton-seed exit and relatively to the walls at C, whereby the feed of the cotton-seed can be regulated.

What I claim is—

1. The combination with the hopper of the cotton seed feeding wheel mounted outside of the hopper and adjustable relatively thereto independently of any movement of the hopper, substantially as set forth.

2. The combination with the hopper having its bottom provided with rearwardly projecting parallel arms, of a distributing wheel having fingers or teeth and the adjustable journal boxes having slotted portions through which nutted bolts are passed, substantially as shown and described.

3. The combination with the hopper and the toothed cotton feed wheel of the adjustable plates or flanges at the sides of the inwardly projecting portion of the wall, and the clamping mechanism on the outside of the hopper for securing said plates after adjustment, substantially as set forth.

4. The combination of the hopper and the toothed wheel of the adjustable plates or flanges at the side of the inwardly projecting portions of the wheel, means for joining together the said flanges at their upper ends and a clamping device outside of the hopper by which both of said flanges can be secured rigidly, substantially as set forth.

5. The combination with the hopper and the toothed cotton seed feeding wheel, of the clamping bolts $e^6$ for securing said wheel after adjustment, and the lock supplemental to said bolts for preventing displacement of the wheel, substantially as set forth.

6. The combination with the hopper and the toothed cotton seed feeding wheel, of the sliding bearings for the said wheel, and the horizontally arranged adjusting mechanism for the seed wheel, substantially as described.

7. The combination with the hopper and the cotton seed feeding wheel mounted outside of the hopper, of the bottom plate of the hopper having rearwardly projecting metallic arms secured thereto for supporting the cotton seed feeding wheel, substantially as described.

8. A planting mechanism having a seed carrying hopper, a cotton seed feeding wheel mounted outside of said hopper adapted to have a portion thereof pass through the rear wall and bottom of the hopper, and the reciprocating corn dropping bar mounted in said hopper, the said cotton seed feeding wheel and the reciprocating corn dropping bar being adapted to receive charges of seed from the feed hopper and each adapted to be thrown out of action when the other is in operation, substantially as set forth.

9. The combination with the hopper and the cotton seed feeding wheel, of the sliding bearings for said wheel, the screw rod $e^8$, the abutment $e^9$ and clamp $e^{10}$, substantially as described.

10. In a cotton and corn planting machine, a cotton planter feed wheel which penetrates the rear wall and bottom of the hopper substantially as and for the purpose set forth in combination with a sliding corn dropping device arranged substantially as set forth and for the purpose specified.

In testimony whereof I affix my signature in presence of two witnesses.

JOHN H. ELWARD.

Witnesses:
J. S. PARTRIDGE,
C. J. PARTRIDGE.